United States Patent Office 3,227,778
Patented Jan. 4, 1966

3,227,778
HARDENED SHAPED ARTICLES AND METHOD
OF MAKING THE SAME
Hermann Delius, Hamburg-Lokstedt, Germany, assignor to Reichhold Chemicals, Inc., White Plains, N.Y.
No Drawing. Filed Sept. 15, 1960, Ser. No. 56,117
Claims priority, application Germany, Mar. 30, 1960, R 27,664
8 Claims. (Cl. 260—859)

The invention relates to the production of hardened shaped articles from molding compositions that contain components capable of forming polymers or copolymers which are hardenable by the application of heat, if necessary after the addition of polymerization catalysts. The invention is primarily directed to the production of molding compositions and laminated structures prepared therefrom which are solid and non-tacky at normal temperatures and, accordingly, possess excellent storage properties, but are capable of being hardened or cured by the application of heat and, if necessary, pressure.

According to German Patent No. 951,888 it is known to prepare structures that are hardenable and capable of being stored, from glass fibers and unsaturated polyester resins and, more particularly, a polyester resin melting above 80° C. prepared from fumaric acid or maleic acid and a polyalcohol obtained by hydroxyalkylation of so-called bis-phenols. The polyester according to this patent preferably also contains a liquid, non-volatile cross-linking compound such as diallyl phthalate. If the polyesters are used in this process without the addition of cross-linking components, although it is possible to obtain dry glass fiber structures capable of being stored, these have the drawback of requiring undesirably long hardening periods. To be sure, it is possible to shorten the hardening periods by the addition of volatile cross-linking compounds, but in that case, depending upon the quantity of cross-linking compound used, only more or less soft or tacky glass fiber structures are obtained which, upon being rolled up or stacked, easily adhere to each other.

U.S. Patent No. 2,598,664 describes the preparation of liquid or viscous polyester mixtures which are obtained from glycols and alpha-beta unsaturated dicarboxylic acids and contain as a cross-linking compound, among others, allyl esters of carbamic acid which can be substituted with allyl groups also at the nitrogen atom. It is stated in this patent (column 16, paragraph 2) that it is possible to prepare a mass capable of hardening under heat and pressure by incompletely curing a resin mixture of the aforesaid type prepared without the addition of catalysts and comminuting the partially polymerized mass. However, such a process is unsuitable for large scale operation since its execution, if at all possible, is much too critical.

In accordance with the present invention it is proposed to use, in a process of this general type, molding compositions containing a compound that is solid at room temperature having the group —NHCOOR, wherein R represents a beta, gamma unsaturated alkenyl residue and, if necessary, other copolymerizable components that are solid at room temperature.

These molding compositions may be obtained in a condition suitable for molding by mixing the components which have been prepared in powdery form, and then pelleting the mixture, the latter operation being known in connection with phenolic resin molding materials. However, it is also possible to first prepare a melt of the components which, upon solidification, is broken up into pieces of suitable particle size. In each case, it is possible to incorporate with the molding compositions fillers of known type.

Mixtures of resins intended for the preliminary impregnation of fabrics or bats of textile or glass fibers are suitably dissolved in inert, easily evaporatable solvents, such as acetone, and applied as a solution to the fibrous body. After the impregnation, the solvents are preferably caused to be evaporated by the application of heat.

If polymerization catalysts are used in the preparation of the molding compositions or the resins used for such preliminary impregnation, care should be taken to select catalysts that become active only at temperatures that are higher than those used during the preparation of the aforesaid molding masses, for example from a melt of the components thereof, during the preliminary impregnation or the drying of the fibrous bodies.

As suitable components of the molding composition, which contain the group —NHCOOR, it is possible to use, within the purview of the present invention, the following monomers that remain solid at room temperature:

(a) Urethanes from monoisocyanates, such as phenyl isocyanate, cyclohexyl isocyanate and stearyl isocyanate, and unsaturated alcohols of the allyl type, as for example allyl-, methallyl-, ethallyl-, chlorallyl-, crotyl alcohol or methyl vinyl carbinol.

(b) Urethanes from di- or polyisocyanates, such as hexamethylene disocyanate, cyclohexane- 1,4-diissocyanate, 2,4-toluylene diisocyanate or 2,6-toluylene diisocyanate as well as the reaction products of diisocyanates with polyalcohols, for example the reaction product of 1 mol trimethylol propane and 3 mol toluylene diisocyanate, and with unsaturated monoalcohols of the allyl type as mentioned above at (a).

(c) Reaction products of condensation products prepared from maleic acid or maleic acid anhydride, if necessary admixed with unsaturated dicarboxylic acids, and an excess of glycols, and a reaction product in a quantity equivalent to the excess glycol obtained from 1 mol of a diisocyanate and 1 mol of an allyl type alcohol, namely the "halfurethane" of a diisocyanate.

Examples 1 to 3 serve to illustrate the production of impregnated glass fiber structures and the molding thereof to form laminated bodies.

*Example 1*

(a) Preparation of a resin solution used for the preliminary impregnation.

A solution in acetone of toluylene diallyl diurethane and an unsaturated polyester obtained in known manner from maleic acid anhydride, phthalic acid anhydride and propanediol-1,2 in a molar ratio of 1:1:2.05, is prepared as follows:

200 gr. of the toluylene diallyl diurethane are combined with 800 gr. of the above polyester containing 0.12 gr. of hydroquinone as a stabilizer, at a temperature of 100–110° C., while passing $CO_2$ thereover and subjecting the mixture to stirring. After thirty minutes the melt is cooled to 80° C., whereupon 590 gr. of acetone are added little by little under refluxing conditions. The solution is cooled to room temperature and then mixed with 10 gr. of p-tert. butyl perbenzoate, this being equal to 1% of the solids content.

(b) Preparation of impregnated glass fiber webs.

A glass fiber web is impregnated with a solution of the resin in an automatic impregnating machine. The drying temperature is adjusted to 80° C. and, as the length of the drying chamber is 1 meter, the web is caused to pass through it at a speed of 12 cm./min.

(c) Preparation of laminated bodies.

A stack of 25 layers of the impregnated glass fiber web is compressed between heated plates at a temperature of 150° C. and a pressure of 15 kg./cm.$^2$ for ten minutes. The resin content of the laminated slab amounted to about 20%.

Example 2

140 gr. of toluylene dimethallyl diurethane are combined with the unsaturated polyester defined in the preceding example and containing as a stabilizer 0.085 gr. of hydroquinone; 470 gr. of acetone are then introduced in the manner previously described. The further processing is carried out as in the preceding example except for the compressing step which in this case required a period of fifteen minutes.

Example 3

232 gr. of N-toluylene isocyanate allyl urethane, which was prepared from 1 mol toluylene diisocyanate and 1 mol allyl alcohol, and a reaction product of 196 gr. of maleic acid anhydride and 196 gr. of propanediol-1,2 with an acid number of 20, were dissolved as described in the two preceding examples in a quantity of acetone sufficient to insure a 56% solids content of the solution. As the solution is slightly thixotropic, it was necessary to maintain it in liquid condition by stirring during the impregnation of the glass fiber web which is carried out in accordance with Example 1. The compressing step is then carried out under the conditions of the preceding examples.

Example 4

This example describes the preparation of a free-flowing molding composition.

A mixture is prepared from the following components:
320 gr. of a polyester having an acid number of 22 and a melting point in the range 65–70° C., which was prepared from equivalent quantities of 2,2-di-(hydroxy propoxy phenyl) propane and maleic acid anhydride previously ground in a sifting mill to a fine powder,
80 gr. of toluylene diallyl urethane, also ground to a fine powder,
200 gr. of kaolin
70 gr. of titanium dioxide
20 gr. of lead stearate
20 gr. of p-tert.-butyl perbenzoate, of 50% concentration, and
50 gr. of a benzoyl peroxide precipitated on chalk. This powder-like mixture is delivered to heated malaxing rollers which are kept at a temperature between 75–95° C. and is homogenized. After the addition of 300 gr. of glass staple fibers which are free of alkali, the mixture is homogenized for another three minutes. The resulting sheet, after cooling off, was hard and non-tacky. It was then ground to a free-flowing granular molding mass which, even after prolonged storage, showed no signs of being tacky.

The processing in the molding press was carried out under the following conditions:

Compressing temperature _____° C__ 160
Specific compressing pressure _____kg./cm.²__ 100
Molding period _____minutes__ 2

The mass showed excellent flowing characteristics. The molded parts had good surface qualities and particularly good resistance toward chemicals.

I claim:

1. The process according to claim 8 characterized by the use of molding mixtures containing polymerization catalysts becoming effective at temperatures above the temperatures which have been used during the course of production of the molding mixtures.

2. A process as set forth in claim 8 wherein component (1) is a reaction product of maleic anhydride, phthalic anhydride and propane diol-1,2 in the molar ratio of 1:1:2.05.

3. The process according to claim 8 characterized by using a molding mixture containing filling material for the production of a molding composition.

4. The process according to claim 8 characterized by soaking fibrous material with the said molding mixture.

5. A cured molded object produced in accordance with the process of claim 8.

6. A process as set forth in claim 8 characterized by fusion of the solid components.

7. A process as set forth in claim 8, wherein a portion at least of the copolymerizable solid components is prepared from solutions thereof in inert evaporable solvents.

8. A process for the preparation of cured molded objects from a polymerizable molding mixture containing as copolymerizable components (1) an unsaturated glycol-dicarboxylic acid polyester which is solid at room temperature, and (2) a nitrogen containing compound which is solid at room temperature, said nitrogen compound being selected from a group consisting of toluylene di(allyl urethane), toluylene di(methylallyl urethane) and toluylene-monoisocyanate allyl urethane, which process comprises copolymerizing said components in the presence of a polymerization catalyst under the influence of heat.

References Cited by the Examiner

UNITED STATES PATENTS

| | | | |
|---|---|---|---|
| 2,326,287 | 8/1943 | Coffman | 260—86.1 |
| 2,443,741 | 6/1948 | Kropa | 260—872 |
| 2,468,713 | 4/1949 | Kropa et al. | 260—80 |
| 2,598,664 | 6/1952 | Kropa | 161—195 |
| 2,612,492 | 9/1952 | Tawney | 260—78.5 |
| 2,647,884 | 8/1953 | Wystrach | 260—47 |
| 2,806,835 | 9/1957 | Nischk et al. | 260—859 |
| 2,915,493 | 12/1959 | Nischk et al. | 260—859 |

FOREIGN PATENTS

| | | |
|---|---|---|
| 129,688 | 10/1948 | Australia. |
| 541,422 | 5/1957 | Canada. |
| 622,235 | 4/1949 | Great Britain. |
| 895,648 | 11/1953 | Germany. |

WILLIAM H. SHORT, *Primary Examiner.*

D. ARNOLD, *Examiner.*